United States Patent [19]

White

[11] Patent Number: 4,532,826

[45] Date of Patent: Aug. 6, 1985

[54] BRAKE VALVE SAFETY DEVICE

[76] Inventor: James B. White, McClelland Rd., Box 45A1, Finleyville, Pa. 15332

[21] Appl. No.: 486,784

[22] Filed: Apr. 20, 1983

[51] Int. Cl.³ .............................................. G05G 1/10
[52] U.S. Cl. ........................................ 74/553; 74/502
[58] Field of Search .................. 74/502, 503, 526, 527, 74/529, 532, 553; 16/121

[56] References Cited

U.S. PATENT DOCUMENTS

| | | | |
|---|---|---|---|
| 1,182,723 | 5/1916 | Waldmeir | 74/503 |
| 1,721,227 | 7/1929 | Manley | 74/526 |
| 1,890,153 | 12/1932 | Hult et al. | |
| 1,966,621 | 7/1934 | Folberth et al. | 188/152 |
| 1,967,151 | 7/1934 | Lustick | 188/265 |
| 2,030,753 | 2/1936 | McDonnell | 188/265 |
| 2,072,666 | 3/1937 | Cartwright | 192/3 |
| 2,117,925 | 5/1938 | Van Meter | 192/13 |
| 2,486,098 | 10/1949 | Batterson | 74/503 |
| 2,709,356 | 5/1955 | Bristow | 70/14 |
| 2,780,322 | 2/1957 | Hickle | 188/90 |
| 2,846,864 | 8/1958 | Polston | 70/181 |
| 2,911,834 | 11/1959 | Mastney et al. | 74/10.33 |
| 2,932,215 | 4/1960 | Crouse | 74/502 |
| 2,963,896 | 12/1960 | Hoffman | 70/181 |
| 3,117,466 | 1/1964 | Hinsey | 74/529 |
| 3,508,625 | 4/1970 | Hawkins | 180/114 |
| 3,533,304 | 10/1970 | Shontz | 74/503 |
| 3,552,518 | 1/1971 | Aldner | 180/114 |
| 3,780,822 | 12/1973 | Frey | 180/114 |
| 3,948,361 | 4/1976 | Carlson | 188/24 |
| 4,008,626 | 2/1977 | Schulte et al. | 74/491 |
| 4,098,529 | 7/1978 | Bingham | 292/1 |
| 4,236,757 | 12/1980 | Gregory | 74/502 |
| 4,297,914 | 11/1981 | Klem et al. | 74/532 |

FOREIGN PATENT DOCUMENTS 1097830 1/1961 Fed. Rep. of Germany ........ 74/503

Primary Examiner—Gary L. Smith
Assistant Examiner—Michael F. Trettel
Attorney, Agent, or Firm—Webb, Burden, Robinson & Webb

[57] ABSTRACT

A brake valve control safety device adapted to be secured to the dashboard of a motor vehicle includes a push-pull switch assembly having a body member, a stem extending through the body member and a knob on the stem, and means on the body member, stem or knob for releasably locking the assembly to prevent release of the vehicle brakes by accidental movement of the valve stem and knob.

6 Claims, 26 Drawing Figures 4,532,826

BRAKE VALVE SAFETY DEVICE

BACKGROUND OF THE INVENTION

1. Field of the Invention

This invention relates to safety devices and particularly to devices for preventing the accidental release of the parking brake valves of motor vehicles, especially school buses and commercial buses, trucks and tractor-trailer combinations. The devices incorporate the conventional push-pull switch assemblies found on the dashboards of such vehicles, but are modified to include means for avoiding inadvertent disengagement of the brakes of the vehicles.

2. Brief Description of the Prior Art

In many motor vehicles, especially school buses and commercial buses, truck and tractor-trailer systems, air braking systems are used. Typically, the parking brake in such a system is set, i.e. the brakes are engaged, by the operator's actuating a dashboard mounted push-pull switch which controls the operation of the valves in the system. The switch assembly for operating the parking brake is mounted on the dashboard in clear view of the vehicle operator and those persons seated in the areas adjacent the operator's seat. A knob on the switch assembly also normally carries information adjacent the switch indicating the control positions of the switch, for example, "Push to Release" and "Pull to Apply" the parking brake.

The easy accessibility of the switch assembly for the brake valve which controls the only parking brake on most of those commercial vehicles creates a dangerous situation in that children or adults can accidentally actuate the switch assembly, thus releasing the parking brakes. In addition, the attractiveness of the switch assembly knob to curious children and adults makes the situation undesirable.

The operation of the parking brake system on large vehicles, such as buses and trucks, is controlled by air and springs. When air pressure is relieved, the brakes on the vehicles are applied by spring loaded canisters mounted near the rear wheels which apply the wheel brakes by rotating a cam which presses the brake lining against the brake drums. When the air pressure is increased to 60 psi and 120 psi, the switch assembly knob on the dashboard can be pushed in to release air to the canisters which, in turn, reverses the action and releases the brakes.

When the vehicle is operated, the air pressure generally ranges between 90 and 120 pounds. When the vehicle is not being moved, however, and is parked, and the air pressure is 60 pounds or greater, the danger of accidental release of the parking brake is greatest since anyone or anything can bump the parking brake switch assembly with very little effort, push in the parking brake knob and release the brakes, causing the vehicles to move. By the present invention, this free wheeling through accidental release of the parking brake can be prevented.

SUMMARY OF THE INVENTION

I have invented a safety device for preventing the accidental release of a vehicle parking brake, especially on commercial vehicles such as buses and trucks, which includes a releasable locking means which requires positive operator action to release the parking valve, and thereby release the parking brake. The safety device comprises, in combination with a push-pull switch assembly mounted on a dashboard of a motor vehicle, means on a body member of the switch assembly, on the valve stem or on the knob of the switch assembly for positively engaging the stem or knob in the extended or brake set position and means for disengaging the stem and knob for return to the first position where the brake valve is released.

Several embodiments of the invention are disclosed herein. In a first embodiment, a body member comprising a threaded hexagon nut with a machined slot is employed. A pin through the stem holding the knob is adapted to be engaged in and disengaged from the slot to control the extent which the control stem knob can be moved. In a second embodiment, which is especially useful with a Williams Air Control or International Harvester valve, the brakes are automatically applied when the control stem and knob is extended or "pops out." To release the valve, the operator must depress a lever and push the knob in to release the brakes.

In a third embodiment of the invention, the brakes are also automatically locked when the control knob "pops out." The operator must depress a button located on a body member attached to the dashboard in order to permit the knob to be pushed in to release the brakes.

A fourth embodiment of the invention comprises a safety device in which the knob normally rotates freely about a control stem upon which it is mounted in the vehicle dashboard. A tension spring is installed on the stem, one end anchored to the stem, the other end anchored to the knob. A narrow, raised portion integral with the knob engages a narrow slot to release the brakes. The same portion prevents the knob from being pushed in accidentally. To release the brakes, the operator must turn the knob, thereby loading the spring, align the raised portion with the slot and push the knob in toward the dashboard.

In a fifth embodiment, a tension spring arrangement is also used, but in this embodiment the control stem and knob are integral. The tension spring is anchored to the body member or hexagonal nut and to the other end of the knob. A slot is provided in the knob to allow it to slip by the anchored portion of the spring, thereby permitting the knob to be pushed in and release the brakes.

A sixth embodiment of the invention utilizes a spring loader plunger slidably positioned in a slot in a body member located on the dashboard. When the knob is pushed in, the plunger rides on the control stem and does not affect the operation of the brake valve. When the knob "pops out" or is pulled out, the plunger drops down automatically between the dashboard and the knob and prevents the knob from being "pushed in" to release the brakes. However, to push the knob in, the operator must release the plunger by pushing upwardly on the plunger.

The safety device according to the invention is, in each case, easy to install and does not affect the physical requirements or mechanical operation of the existing brake assembly in any way. It provides a substantially fail-safe parking brake lock which will prevent any accidental release, and discourages intentional release, of parking brakes of commercial vehicles, such as buses and trucks, by pushing the control knob.

DETAILED DESCRIPTION OF PREFERRED EMBODIMENTS OF THE INVENTION

Figure 1:
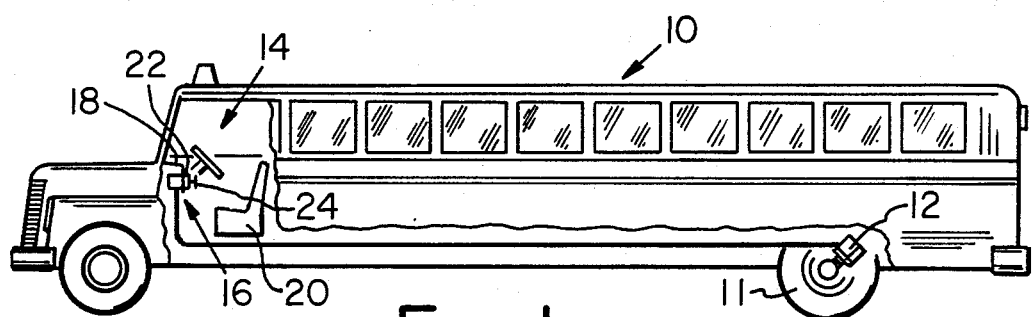
FIG. 1 is a side elevational view, partially cut away, of a school bus showing a schematic of a typical brake system including the location of a safety device in accordance with the invention.
Figure 2:
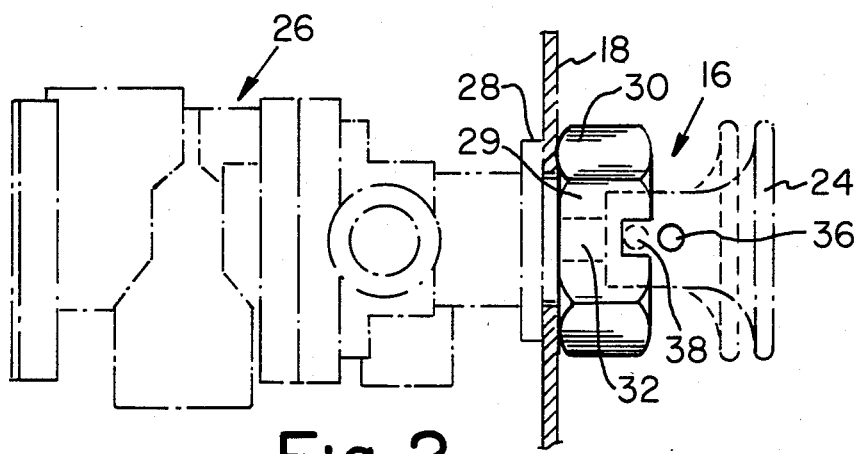
FIG. 2 is a top plan view of a first embodiment of the invention in a safety device.
Figure 3:
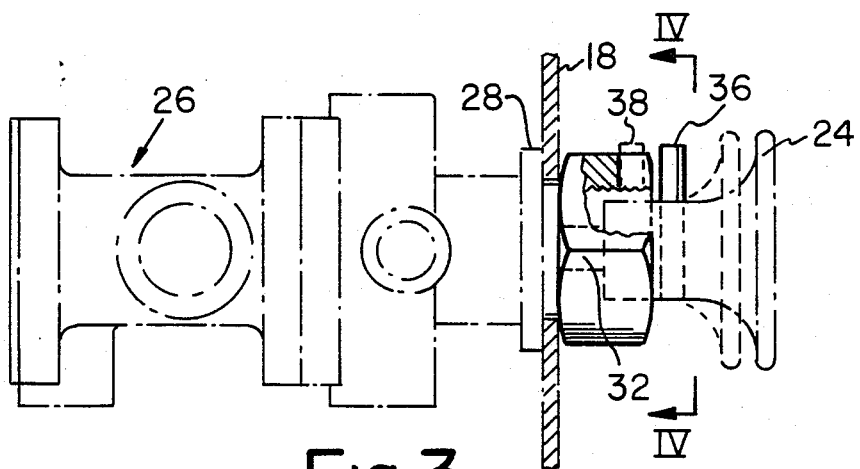
FIG. 3 is a side elevational view of FIG. 2 partially cut away and partially in section.
Figure 4:
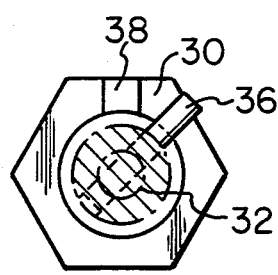
FIG. 4 is a sectional view taken along lines IV—IV of FIG. 3 with the knob pulled out to engage the brakes.
Figure 5:
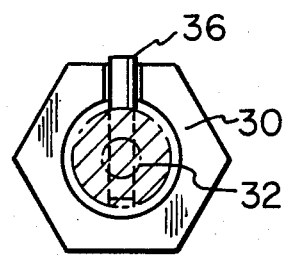
FIG. 5 is a sectional view taken along line IV—IV of FIG. 3 with the knob pushed in to release the brakes.
Figure 6:
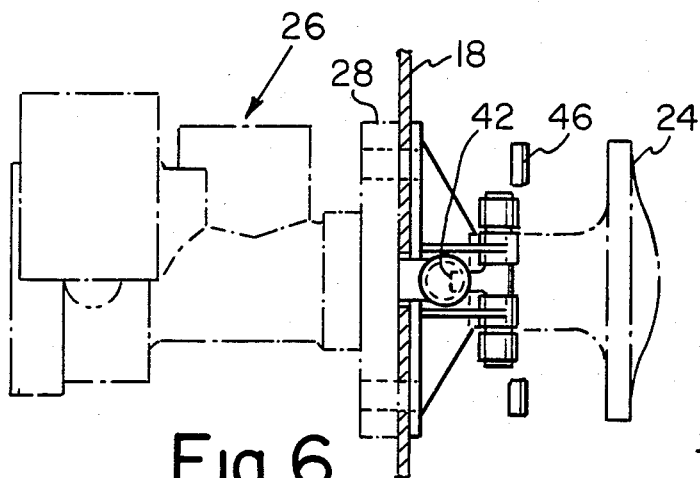
FIG. 6 is a top plan view of a second embodiment of the invention in a safety device.

The present invention in a safety device for controlling a brake valve is especially suitable for use in larger commercial vehicles which utilize air brake systems, such as a school bus 10 shown in FIG. 1. The bus braking system comprises brake drums on the rear wheels 11 adapted to be engaged and disengaged by brake linings on brake shoes actuated by spring loaded canisters 12 controlled by an operator from the operator's compartment 14 of the bus. The brake control is effected through the use of a safety device 16 located on the dashboard 18 of the vehicle within reach of an operator on seat 20. The device incorporates a push-pull switch assembly 22 having a knob 24 which is within the normal reach of the operator and clearly visible by the operator and passengers in seats close to the operator's compartment 14.

For purposes of explaining the invention, I have shown in the drawings six different embodiments of my safety device and the components of each embodiment will be described with respect to the illustrations thereof and identified by the same reference numerals throughout. It is to be understood that the embodiments described herein are only examples of the invention and that it may be otherwise embodied within the scope of the claims.

In a first embodiment of the invention shown in FIGS. 2-5 the safety device 16 is mounted to dashboard 18 for operating the air valve 26 in the brake system. The device comprises a collar 28 which abuts one side of the dashboard 18 and has a stud 29 upon which a body member or nut 30 is mounted. A stem 32 extends from valve 26 through the collar and stud and a knob 24 is secured to the end thereof. The knob is adapted to be pushed and pulled to activate and deactivate the valve 26 and thereby to set and release the brake system of the vehicle.

To prevent accidental disengagement of the brakes after the knob is pulled out to set them, a pin 36 is provided in the stem. When the knob is in, the pin 36 normally fits within a slot 38 in the nut 30. However, after the knob is pulled out to set the brakes, the operator can twist the knob clockwise so that the pin 36 abuts the front face of the nut, preventing the knob from being pushed in to release the brakes. When it is desired to release the brakes, the operator returns the knob to the position where the slot and pin are aligned and pushes in the knob to release the brakes.

Figure 7:
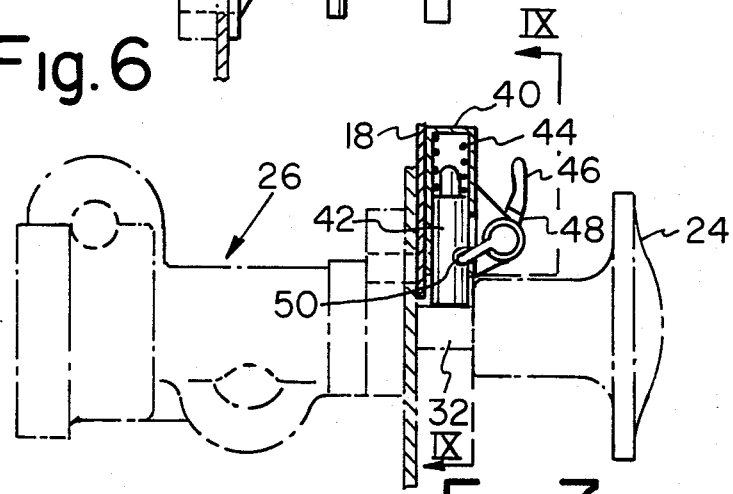
FIG. 7 is a side elevational view of FIG. 6 partially cut away and partially in section of the safety device with the brakes engaged.
Figure 8:
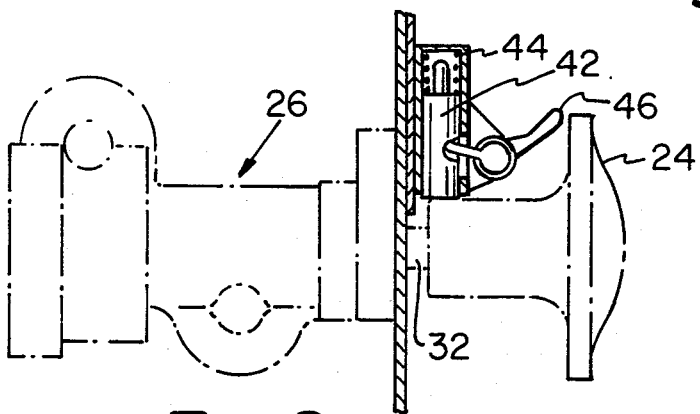
FIG. 8 is a side elevational view of FIG. 6 partially cut away and partially in section showing the safety device with the brakes in the released position.
Figure 9:
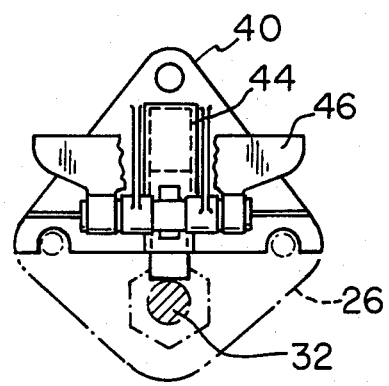
FIG. 9 is a sectional view taken along lines IX—IX of FIG. 7.
Figure 10:
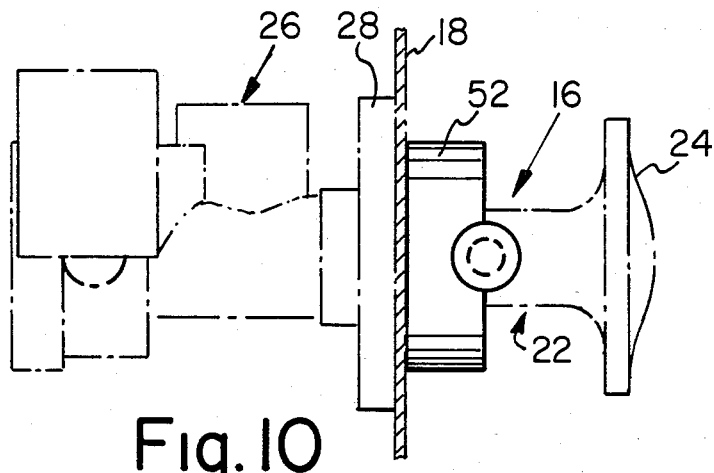
FIG. 10 is a top plan view of a third embodiment of the invention in a safety device.
Figure 11:
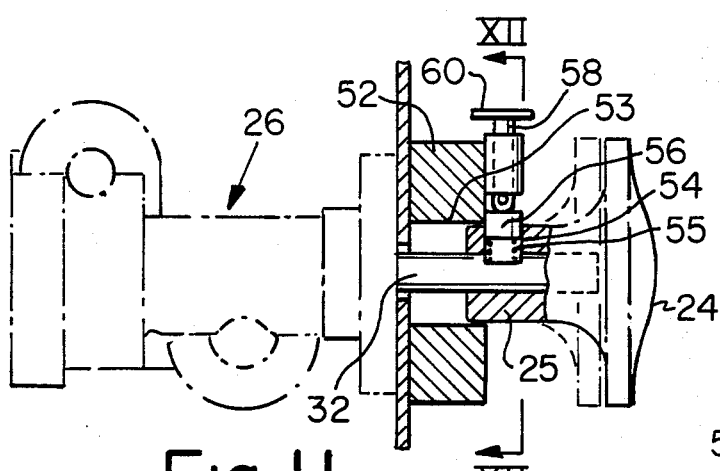
FIG. 11 is a side elevational view partially cut away and partially in section of the safety device of FIG. 10.
Figure 12:
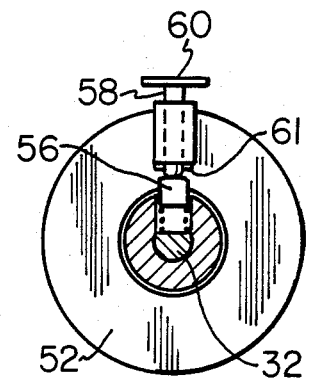
FIG. 12 is a sectional view taken along lines XII—XII of FIG. 11 showing the brakes engaged.
Figure 13:
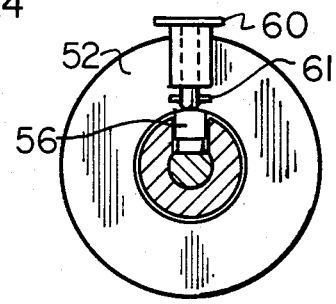
FIG. 13 is a sectional view taken along lines XII—XII of FIG. 11 showing the brakes released.
Figure 14:
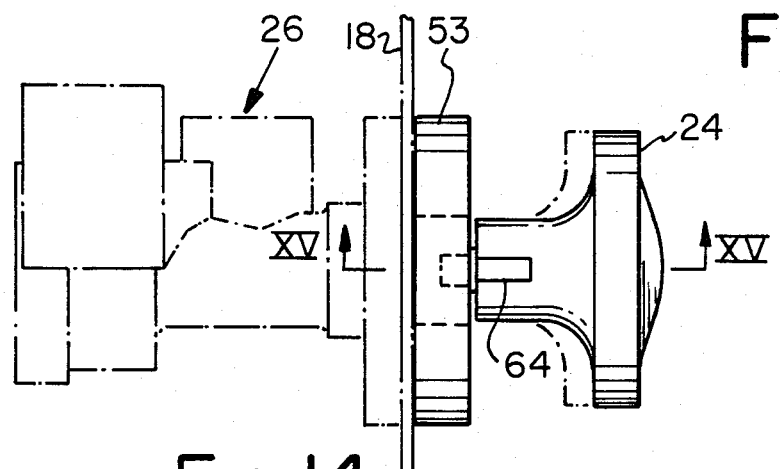
FIG. 14 is a top plan view of a fourth embodiment of the invention in a safety device.

The second embodiment of the invention is shown in FIGS. 6-9. Again, the safety device is mounted on the dashboard 18 of the vehicle and controls the valve 26 using a knob 24 attached to a stem 32 which extends through the dashboard to the valve. To prevent accidental release of the brakes, a body member including a housing 40 is provided on the dashboard above and aligned with the stem 32. A pin 42 is slidably mounted within the housing 40 and biased in the downward direction, i.e. the direction of the stem by a spring 44. A lever 46 pivotally mounted on the housing 40 and having a nib 48 engageable in a slot 50 in the pin is used to raise the pin in the housing against the force of the spring. When the knob 24 is pushed in, the bottom of the pin 42 rests on the knob (FIG. 8). When the knob is pulled out, the pin, under force of the spring, abuts the stem 32 between the knob 24 and the dashboard 18 and prevents the knob from being pushed in accidentally to release the brakes (FIG. 7). To disengage the brakes, the lever 46 is depressed to rotate the nib to raise the pin 42 and the knob is pushed in to the position shown in FIG. 8.

FIGS. 10-13 illustrate a third embodiment of the invention wherein the air valve 26 is operated by a safety device 16 having a push-pull switch assembly 22 mounted on a dashboard 18 of a vehicle and including a body member in the form of a circular block 52 having a central opening 53 large enough to admit the inner end 25 of knob 24 which is attached to stem 32. Within the knob end 25 is a slot 54, a coil spring 55 in the slot and a stop 56 which is adapted to ride on the spring and is normally forced upwardly out of the slot. A pin 58 with a head 60 and a transverse stop 61 is mounted on the block 52 and aligned with but independent of the stop when the knob is pulled out, as in FIG. 11. When the pin 58 is pushed down, the stop 56 which abuts the block to hold the knob 24 out to keep the brakes engaged, is also pushed into the slot, permitting the end of the knob to pass within the block and the brakes are released. When the knob 24 is pulled out, the stop 56 under force of spring 55 extends beyond the opening 53 to prevent the knob 24 from being pushed in accidentally.

Figure 15:
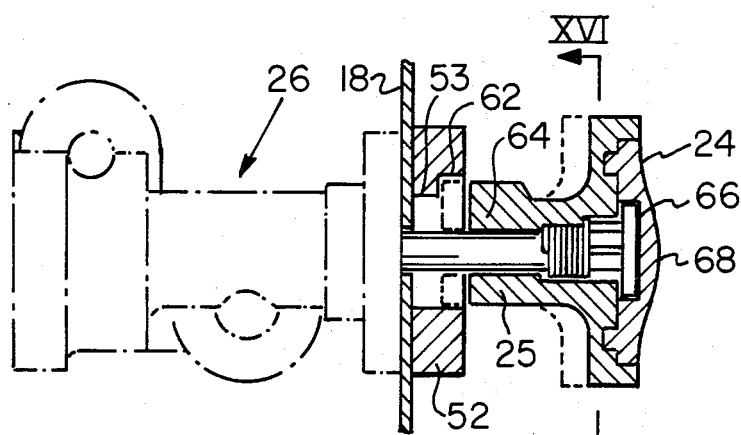
FIG. 15 is a side elevational view partly in section taken along lines XV—XV of FIG. 14 showing the safety device.
Figure 16:
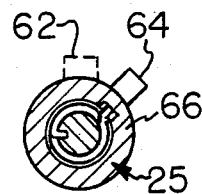
FIG. 16 is a sectional view taken along lines XVI—XVI of FIG. 15 with the knob in the pulled out position to engage the brakes.
Figure 17:
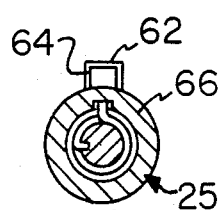
FIG. 17 is a sectional view taken along lines XVI—XVI of FIG. 15 with the knob in the pushed in position to release the brakes.
Figure 18:
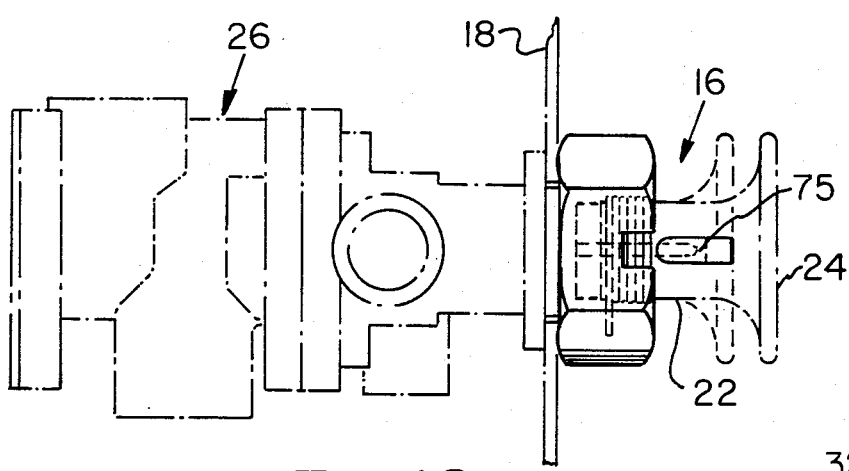
FIG. 18 is a top plan view of a fifth embodiment of the invention showing the safety device.
Figure 20:
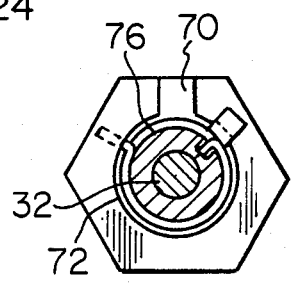
FIG. 20 is a sectional view taken along lines XX—XX of FIG. 19 with the knob in the pulled out position to engage the brakes.
Figure 19:
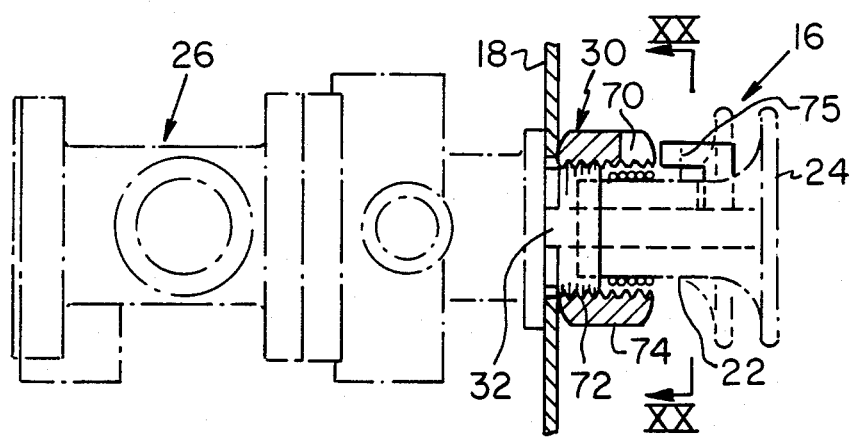
FIG. 19 is a side elevational view, partly in section, of the device of FIG. 18.
Figure 21:
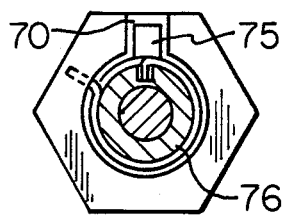
FIG. 21 is a sectional view taken along lines XX—XX of FIG. 19 with the knob in the pushed in position to disengage the brakes.
Figure 22:
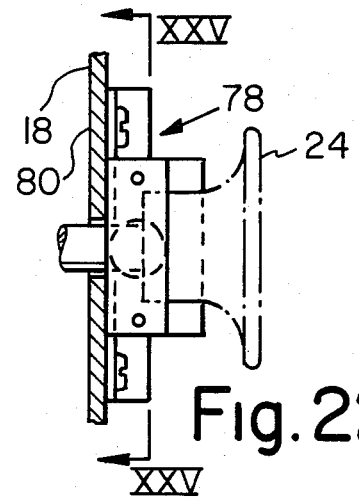
FIG. 22 is a top plan view of a sixth embodiment of the safety device.

In a fourth embodiment of the invention, shown in FIGS. 14-17, the safety device 16 is mounted on a dashboard 18 to control valve 26 to engage and disengage the vehicle brake system. In this embodiment a new design for knob 24 is required, as shown in FIG. 15, such that the inner end 25 of the knob can fit within a slot 62 provided on the edge of central opening 53 through the circular block 52 secured to the dashboard 18. The knob 24 is made in two parts. The first part includes the end 25 with a narrow raised portion or fin 64 which is adapted to engage in slot 62 in block 52 when the knob 24 is pushed in. A central bore is provided in knob 24 for receiving the end of stem 32. A tight spring 66 is wound on the stem and one end of the spring is affixed to the stem 32 and the other end to the knob 24. The second part of the knob is a cap portion 68 which fits over the end of the knob 24 opposite end 25. When the brakes are engaged by pulling the knob 24 out, the spring unloads turning the knob such that fin 64 is out of alignment with slot 62 in block 52 and preventing accidental release of the brakes. To release the brakes, the operator must turn the knob 24, thereby loading the spring, align the fin with the slot and push the knob 24 in.

In the fifth embodiment of the invention shown in FIGS. 18-21, the air valve 26 is operated by the safety device 16 including push-pull switch assembly 22 mounted on dashboard 18 and including a body member in the form of a threaded nut 30 including a slot 70 extending from the central threaded opening 72 of the nut to its outer surface 74. In this embodiment the knob 24 with a stop 75 and the stem 32 are integrally formed and rotate together. A tension spring 76 is secured to the nut 30 and to the end of knob 24. With the knob in the "out" position, the tension spring is unloaded and the knob cannot be pushed in due to the engagement of the stop 75 with the face of the nut. To push in the knob 24, the knob 24 is rotated by the operator to align the stop 75 with slot 70, putting tension on spring 76 and permitting the stop to slide into the slot thereby disengaging the brakes.

Figure 23:
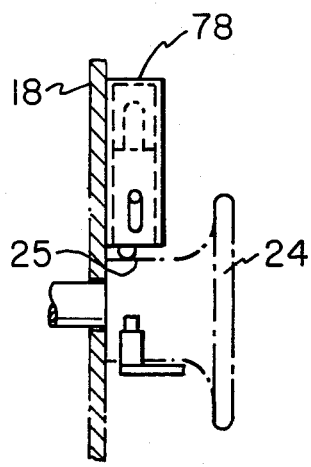
FIG. 23 is a side elevational view partly in section showing the safety device of FIG. 22 in the pushed in position with the brakes disengaged.
Figure 24:
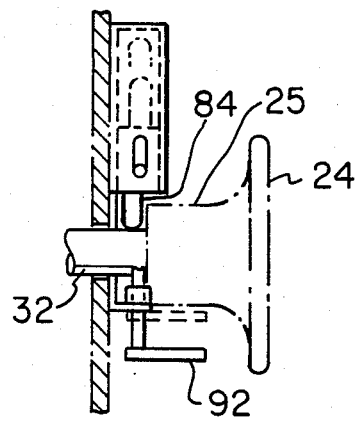
FIG. 24 is a side elevational view partly in section showing the safety device of FIG. 22 in the pulled out position with the brakes engaged.
Figure 25:
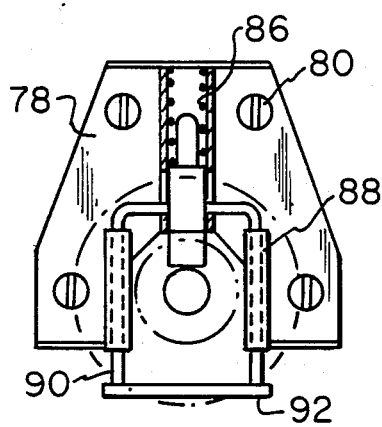
FIG. 25 is a sectional view taken along lines XXV—XXV of FIG. 22 showing the knob of the safety device in the pulled out position with the brakes engaged.
Figure 26:
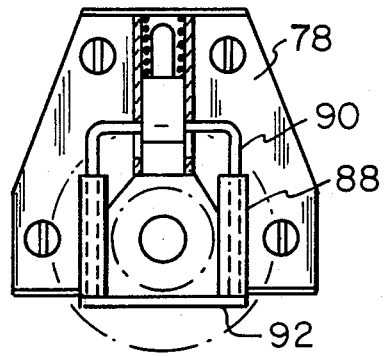
FIG. 26 is a sectional view taken along lines XXV—XXV of FIG. 22 showing the knob of the safety device pushed in with the brakes engaged.

The sixth embodiment of the safety device is shown in FIGS. 22-26. The knob 24 is again secured to stem 32 which passes through dashboard 18 and operates the air valve (not shown in these figures). A body member in the form of a block 78 is secured to the dashboard 18 by fasteners 80. A pair of guides 88 secured to the housing guide a rod 90 extending through the plunger 84 and a flat release plate 92 is located on the ends of the rod 90. When the knob is pushed in and the brakes are released, the bottom of the plunger 84 abuts the inner end 25 of the knob 24 as shown in FIG. 23. When the knob is pulled out to set the brakes, the plunger 84 under force of spring 86 abuts the stem between the inner end 25 of the knob 24 and the dashboard 18, preventing the knob 24 from being pushed in. To release the brakes, the plate 92 (being integral with rod 90 and plunger 84) is pressed upwardly out of the path of the knob 24, which can then be pushed in. As shown in FIGS. 23 and 24, the knob 24 acts as a guard preventing the plate 92 from being accidentally pushed up.

In the embodiments described, I have referred to the device as incorporating a "push-pull" switch assembly. However, the invention is applicable to brake systems in which, upon loss of air for example, the brakes are automatically set and the control knob 24 "pops out" automatically. In the case of the automatic brake system, the device works the same as in the manual arrangement. To release the brakes, the procedure described with respect to each embodiment is followed.

The present invention is relatively inexpensive to manufacture and to install. It is easy to operate with one hand. It can be used on existing or new vehicles. It is urgently needed to prevent the accidental release of brakes on large vehicles which can result in serious injury to passengers and pedestrians and extensive damage to property.

Having described a presently preferred embodiment of my invention, it is to be understood that it may otherwise be embodied within the scope of the appended claims.

I claim:

1. In a brake valve control device adapted to be secured to the dashboard of a motor vehicle and including a push-pull switch assembly having a body member for attachment to the dashboard, a stem extending through said body member, and a knob on said stem for moving the stem toi activate and deactivate the valve, the improvement in a safety device comprising releasable locking means on said body member, and engageable with said stem and knob for preventing release of the vehicle brakes by accidental movement of the valve stem and knob, said body member including a housing having a slidable pin therein, said pin being aligned with said stem and biased toward said stem and lever means on said housing and engaged with said pin for moving said pin against the bias, whereby when the stem of the switch assembly is pushed in the pin engages said knob, when the stem of the assembly is pulled out the pin extends under the force of the bias and engages the stem between the dashboard and the knob to prevent the stem from being pushed in, and when the lever means is operated to move said pin against the bias, the stem can be pushed in.

2. In a brake valve control device adapted to be secured to the dashboard of a motor vehicle and including a push-pull switch assembly having a body member for attachment to the dashboard, a stem extending through said body member, and a knob on said stem for moving the stem to activate and deactive the valve, the improvement in a safety device comprising releasable locking means on said stem and knob and engageable with said body member for preventing release of the vehicle brakes by accidental movement of the valve stem and knob, said body member including a housing having a slidable pin therein and said knob and stem including a slot having a stop therein, said stop being biased toward and aligned with said pin whereby when said stem is pushed in the stop is within the slot, when the stem is pulled out the stop is biased out of the stem and engages the body member, and when the pin is extended it engages the stop to replace it within the slot to permit the stem to be pushed in.

3. In a brake valve control device adapted to be secured to the dashboard of a motor vehicle and including a push-pull switch assembly having a body member for attachment to the dashboard, a stem extending through said body member, and a knob on said stem for moving the stem to activate and deactivate the valve, the improvement in a safety device comprising releasable locking means on said body member and knob for preventing release of the vehicle brakes by accidental movement of the valve stem and knob, said body member including a slot aligned with the stem, said knob including means for engaging said slot when said assembly is pushed in, with a spring surrounding said stem, one end secured to said knob and the other end secured to the stem for loading the knob, whereby when the stem is pushed in the means engages the slot; when the stem is pulled out and rotated to unload the spring, the slot engaging means engages the housing to prevent the stem from being pushed in; and when the knob is counter-rotated to load the spring, the slot engaging means disengages from the housing and when aligned with the slot permits the stem to be pushed in.

4. The improvement as set forth in claim 3 wherein the slot extends over the face of the housing and the spring surrounds the knob on the stem.

5. In a brake valve control device adapted to be secured to the dashboard of a motor vehicle and including a push-pull switch assembly having a body member for attachment to the dashboard, a stem extending through said body member, and a knob on said stem for moving the stem to activate and deactivate the valve, the improvement in a safety device comprising releasable locking means on said body member and engageable with said stem and knob for preventing release of the vehicle brakes by accidental movement of the valve stem and knob, said body member including a housing, a plunger slidably positioned in the housing and in alignment with the stem, a spring biasing the plunger in the direction of the stem, and means attached to the plunger for sliding it in the housing, whereby when the stem is pushed in the plunger engages the knob, when the stem is pulled out the plunger engages the stem, and when the means are actuated to move the plunger from between the knob and the dashboard, the stem can be pushed in.

6. The improvement as set forth in claim 5 wherein the means for sliding the plunger comprises a bent rod attached to the plunger, the ends of the rod having a plate which is adapted to be pushed, and the rod positioned in guides on the body member for guiding the plunger in the housing.

* * * * *

UNITED STATES PATENT AND TRADEMARK OFFICE
CERTIFICATE OF CORRECTION

PATENT NO. : 4,532,826
DATED : August 6, 1985
INVENTOR(S) : James B. White

It is certified that error appears in the above-identified patent and that said Letters Patent is hereby corrected as shown below:

Column 2 Line 46 "loader" should read --loaded--.

Claim 1 - Column 6 Line 45 "toi" should read --to--.

Signed and Sealed this

Fifth Day of November 1985

[SEAL]

Attest:

Attesting Officer

DONALD J. QUIGG

Commissioner of Patents and Trademarks